US011225061B2

(12) United States Patent
Arena et al.

(10) Patent No.: US 11,225,061 B2
(45) Date of Patent: Jan. 18, 2022

(54) OXYGEN SCAVENGING FILMS

(71) Applicant: Cryovac, Inc., Charlotte, NC (US)

(72) Inventors: Francesco Arena, Legnano (IT); Dario Dainelli, Parabiago (IT); Larry Bickle McAllister, Jr., Spartanburg, SC (US)

(73) Assignee: Cryovac, LLC, Charlotte, NC (US)

( * ) Notice: Subject to any disclaimer, the term of this patent is extended or adjusted under 35 U.S.C. 154(b) by 513 days.

(21) Appl. No.: 15/574,635

(22) PCT Filed: May 25, 2016

(86) PCT No.: PCT/US2016/034099
§ 371 (c)(1),
(2) Date: Nov. 16, 2017

(87) PCT Pub. No.: WO2016/196121
PCT Pub. Date: Dec. 8, 2016

(65) Prior Publication Data
US 2018/0134013 A1 May 17, 2018

Related U.S. Application Data

(60) Provisional application No. 62/167,926, filed on May 29, 2015.

(51) Int. Cl.
| B32B 27/08 | (2006.01) |
| B32B 27/18 | (2006.01) |
| B32B 27/28 | (2006.01) |
| B32B 27/30 | (2006.01) |
| B32B 27/32 | (2006.01) |
| B32B 27/36 | (2006.01) |
| B32B 7/02 | (2019.01) |
| B32B 7/12 | (2006.01) |
| B32B 7/00 | (2019.01) |
| B32B 27/06 | (2006.01) |
| B32B 27/00 | (2006.01) |

(52) U.S. Cl.
CPC ............... *B32B 27/08* (2013.01); *B32B 7/00* (2013.01); *B32B 7/02* (2013.01); *B32B 7/12* (2013.01); *B32B 27/00* (2013.01); *B32B 27/06* (2013.01); *B32B 27/18* (2013.01); *B32B 27/28* (2013.01); *B32B 27/30* (2013.01); *B32B 27/306* (2013.01); *B32B 27/308* (2013.01); *B32B 27/32* (2013.01); *B32B 27/36* (2013.01); *B32B 2250/00* (2013.01); *B32B 2264/00* (2013.01); *B32B 2264/10* (2013.01); *B32B 2264/102* (2013.01); *B32B 2264/107* (2013.01); *B32B 2307/50* (2013.01); *B32B 2307/71* (2013.01); *B32B 2307/7242* (2013.01); *B32B 2307/7244* (2013.01); *B32B 2307/7246* (2013.01); *B32B 2307/7248* (2013.01); *B32B 2307/7265* (2013.01); *B32B 2307/74* (2013.01); *B32B 2435/00* (2013.01); *B32B 2435/02* (2013.01); *B32B 2439/00* (2013.01); *B32B 2439/06* (2013.01); *B32B 2439/40* (2013.01); *B32B 2439/46* (2013.01); *B32B 2439/70* (2013.01)

(58) Field of Classification Search
CPC ......... B32B 27/08; B32B 27/00; B32B 27/30; B32B 27/06; B32B 7/00; B32B 27/36; B32B 27/32; B32B 27/308; B32B 27/306; B32B 27/28; B32B 27/18; B32B 7/12; B32B 7/02; B32B 2264/10; B32B 2307/71; B32B 2264/00; B32B 2307/50; B32B 2435/00; B32B 2439/70; B32B 2439/00; B32B 2264/107; B32B 2250/00; B32B 2439/06; B32B 2439/46; B32B 2307/7248; B32B 2307/7242; B32B 2307/7265; B32B 2307/7246; B32B 2439/40; B32B 2435/02; B32B 2307/7244; B32B 2307/74; B32B 2264/102
USPC ...................... 428/195.1, 330, 331, 335, 500
See application file for complete search history.

(56) References Cited

U.S. PATENT DOCUMENTS

| 2001/0008662 A1* | 7/2001 | Blinka ................... B32B 27/18 428/35.8 |
| 2004/0151934 A1 | 8/2004 | Schwark et al. |
| 2004/0234797 A1 | 11/2004 | Schwark et al. |
| 2005/0244665 A1 | 11/2005 | Rivett et al. |
| 2006/0177653 A1 | 8/2006 | Rivett et al. |
| 2007/0141366 A1 | 6/2007 | Rivett et al. |

\* cited by examiner

*Primary Examiner* — Gerard Higgins
*Assistant Examiner* — Kevin C Ortman, Jr.
(74) *Attorney, Agent, or Firm* — Jason R. Womer

(57) ABSTRACT

The invention discloses oxygen scavenging films having at least one oxygen scavenging layer comprising a blend of ethylene/methyl acrylate/cyclohexene methyl acrylate copolymer (EMCM) as oxygen scavenger resin and a catalyst in a carrier resin, and an outer substrate layer having a thickness greater than 5% with respect to the total thickness of the film. The invention also relates to a process for the manufacturing of such films, to the use of said films in food packaging and to the packages obtained therefrom.

20 Claims, No Drawings

OXYGEN SCAVENGING FILMS

CROSS-REFERENCE TO RELATED APPLICATION

This application claims priority from U.S. Non-Provisional Application Ser. No. 62/167,926 filed May 29, 2015, which the application is hereby expressly incorporated by reference herein.

FIELD OF THE INVENTION

The present invention relates to multilayer oxygen scavenging films, to their use in packaging operations and to the packages obtained therefrom. The invention also relates to a process for the manufacturing of such oxygen scavenging films.

BACKGROUND OF THE INVENTION

It is known that many oxygen sensitive products, including food products such as dried milk, meat and cheese, smoked and processed luncheon meats as well as non-food products such as electronic components, pharmaceuticals, and medical products, deteriorate over time in the presence of oxygen, in part because of dissolved oxygen typically present in the packaged material at the time it is placed in the packaging container and also in part due to oxygen ingress which occurs during storage. Both the color and the flavor of foods can be adversely affected. The oxidation of lipids within the food product can result in the development of rancidity.

The term "rancidity" is used to describe two entirely different processes:
 Oxidative rancidity is a condition caused by fat oxidation
 Hydrolytic rancidity is a condition caused by fat hydrolysis.

Oxidative rancidity of fats such as lard, shortenings, salad and cooking oils refers to the undesirable odours and flavors which develop when such products are exposed to the oxygen in the air. Products containing these fats, including but not limited to food products such as dried milk, meat and cheese, smoked and processed luncheon meats can become rancid as the fats in the products react to air. The (poly)-unsaturated fatty acid portions of these foods react with oxygen to form peroxides. The peroxides decompose to yield complex mixtures of oxidized derivatives, including aldehydes, ketones, and other volatile products. These products are responsible for "rancid" odours and flavors. Highly saturated fatty acid portions of these foods, such as butter or palm oil, are not as prone to oxidative rancidity due to the absence or low amount of (poly)-unsaturated fatty acid compounds.

Hydrolytic rancidity refers to the odour that develops when triglycerides are hydrolyzed and free fatty acids and salts from free fatty acids (soaps) are released. In particular, short chain fatty acids, such as common butter fats, are odorous.

Rancidity in foods may range from very slight, resulting in loss of freshness, to very severe, resulting in objectionable odours and/or flavors. Slight degrees of rancidity are much more common in foods than severe rancidity, and are much more a practical concern. A slight degree of rancidity may not be objectionable to consumers, but products which do not seem fresh will not attract repeat purchases. If customers do not return to a product, the long-term effects of a slight degree of rancidity can be very serious.

The use of techniques that limit exposure of oxygen sensitive products to oxygen is useful to maintain quality of these products over time and to provide extended shelf life for the packaged products. Limiting the exposure of oxygen-sensitive products to oxygen maintains and enhances the quality and shelf life of many products. For instance, by limiting the oxygen exposure of oxygen-sensitive food products in a packaging system, the quality of the food product can be maintained and spoilage retarded, thus such packaging also keeps the product in inventory longer, thereby reducing costs incurred from waste and having to restock. In some embodiments, additional benefits of such packaging can be their ability to act as a barrier to moisture (water vapor), by limiting both moisture egress from the packaged material to the environment outside the package, and moisture ingress from the outside environment into the package. In some embodiments, the films may exhibit low permeability to other gases, such as 002, and to aroma and flavours. These further characteristics are particularly appreciated for food products such as dried milk.

It is important to note that, for environmental and health reasons, there is an increasing demand in the food marketplace to avoid use of highly saturated oils, such as palm kernel oil and palm oil, whose total content of unsaturated fatty acids is only 13% and 46% respectively.

At the same time, there is increasing pressure in the marketplace to use, especially in certain foods, more highly unsaturated alternatives which are healthier, but unfortunately have the disadvantage of being more oxygen sensitive.

The problem of limiting oxygen exposure become of particularly relevance in the field of certain food products wherein the trend is to substitute palm oils with oils having higher unsaturation, such as canola oil (total unsaturated fatty acids 88%), safflower oil and sunflower oil (total unsaturated fatty acids 86%), corn oil (total unsaturated fatty acids 83%), olive oil (total unsaturated fatty acids 82%) and soybean oil (total unsaturated fatty acids 81%).

In the food packaging industry, several techniques have been developed to limit oxygen exposure of oxygen-sensitive packaged materials. Such techniques include the creation of a reduced oxygen environment within the package, such as modified atmosphere packaging (MAP) and vacuum packaging.

Another technique to limit oxygen exposure of oxygen-sensitive packaged materials is to use a barrier material or a layer (a material or layer having low permeability to oxygen) as part of the packaging. Materials that have been developed to provide oxygen barrier properties to the packaging are for example ethylene vinyl alcohol and copolymer(s) (EVOH), polyamide, polyvinyl chloride and polymer(s), polyvinylidene dichloride and copolymer(s), polyesters such as polyethylene terephthalate (PET), polyethylene naphthenate (PEN), and their copolymer(s), polyacrylonitrile, and combinations thereof.

Some of these materials have been used as a barrier layer in conjunction with multilayer packaging films.

Another technique to limit oxygen-sensitive packaged materials to oxygen exposure involves the use of oxygen scavengers. Oxygen scavengers can be included within the cavity of the package in the form of a sachet or the like. Such packaging devices have the disadvantages of requiring additional packaging operations, potential breakage of the sachet causing contamination of the packaged goods, and uneven or localized scavenging. Alternately, regulating the exposure to oxygen involves incorporation of an oxygen scavenging agent directly into the packaging structure itself. For example, oxygen scavengers have been utilized as part of the package element (film, gasket, coating, etc.). Such application has been found to provide a more uniform scavenging effect throughout the package and to provide a means of intercepting and scavenging oxygen as it passes through the walls of the package. Incorporation of a scavenging agent is also used to consume oxygen contained in the packaging article either as residual air oxygen in the packaged goods and/or in the void space within the packaging article not occupied by the packaged goods (herein after referred to as "headspace oxygen scavenging' applications). Headspace oxygen scavenging often entails the removal of significant quantities of oxygen from the interior of the package.

The oxygen scavengers react with oxygen that is trapped in the package or that, over time, permeates into the package. For instance, this is described in U.S. Pat. Nos. 4,536,409 and 4,702,966 and the prior art discussed in these references.

Various agents have been proposed as oxygen scavengers. For example, Michael Rooney, in his article "Oxygen Scavenging: A Novel Use of Rubber Photo-Oxidation", Chemistry and Industry, Mar. 20, 1982, Pg. 197-198, describes the use of ethylenically unsaturated compounds as oxygen scavengers when exposed to light. It is known that the incorporation of compounds which are ethylenically unsaturated often cleave as a consequence of the reactions of the oxygen scavenging process. For example, films containing unsaturated compounds, such as squalene or vegetable oils, produce large amounts of volatile aldehydes and ketones upon oxidation. Unfortunately many of the resultant volatile compounds are not maintained within the film structure and find their way into the headspace of the package. Here they have the potential to degrade the taste, color and/or odour of comestible products.

U.S. Pat. No. 6,254,803 in the name of the same applicant discloses an oxygen scavenger composition comprising or including a polymer or oligomer having at least one cyclohexene group or functionality. The oxygen scavenger composition disclosed therein does not generate large amounts of oxidation fission products during scavenging and is substantially stable with respect to reaction with oxygen until triggered by an external event, such as irradiation by electromagnetic radiation.

EP 1699710 B1 in the name of the same applicant, discloses an oxygen scavenger composition and packaging materials thereof, comprising a mixture of at least one polyester condensation polymer having cycloalkenyl group (s) or functionality with a second polymer having ester groups. Said composition acts as an oxygen scavenger agent under both ambient and refrigerated conditions, and is compatible with conventional film forming packaging materials so it is readily processed using conventional film forming equipment.

U.S. Pat. No. 7,258,930 in the name of the same applicant, discloses an oxygen scavenging film comprising a layer comprising poly(ethylene methyl acrylate/cyclohexene methyl acrylate [EMCM] as oxygen scavenger and a layer, the same or different, comprising a cyclic olefin copolymer. The presence of a layer comprising cyclic olefin copolymer reduces the delamination of the EMCM layer from the adjacent layers at temperatures encountered during, or immediately after, heat sealing of the film to itself or another material.

Many of these films, although providing some level of barrier to oxygen may still permit some oxygen to pass through the film and enter the package. As a result, the film may not provide the desired level of oxygen barrier properties. Furthermore, these films still have the potential to create organoleptic issues due to the production of volatile compounds as byproducts of the oxidation of the oxygen scavenging component.

Accordingly, the present invention seek to address the problem of providing efficient oxygen scavenging films, and at the same time overcoming the organoleptic problems resulting from the decomposition products of the oxygen scavenger component.

SUMMARY OF THE INVENTION

In a first aspect the present invention is directed to a multilayer oxygen scavenging film comprising:
A) a first outer sealant layer, optionally comprising at least one odour absorber,
B) at least one oxygen scavenging layer,
C) at least one bulk layer,
D) at least one adhesive layer, and
E) a second outer substrate layer comprising a material selected from polyester, aromatic polyester, and PET, wherein
said at least one oxygen scavenging layer B) comprises a blend of ethylene/methyl acrylate/cyclohexene methyl acrylate copolymer (EMCM) as oxygen scavenger resin and a catalyst in a carrier resin, and
said second outer substrate layer E) has a thickness greater than 5% with respect to the total thickness of the film.

In a second aspect, the present invention is directed to a process for the manufacture of a film according to the first aspect of the present invention.

In a third aspect, the present invention is directed to a package comprising a container, a product and a lid containing the oxygen scavenging film according to the first aspect of the present invention, the lid sealed onto said container.

In a fourth aspect, the present invention is directed to a bag, pouch, or multi-compartment tray-less container comprising the oxygen scavenging film of the first aspect of the present invention, sealed to itself.

In a fifth aspect, the present invention is directed to a package comprising a bag, pouch, or multi-compartment tray-less container comprising the oxygen scavenging film of the first aspect of the present invention sealed to itself and containing the product.

In a sixth aspect, the present invention is directed to the use of the oxygen scavenging film according to the first aspect of the present invention for packaging food, in particular for food containing oxygen sensitive unsaturated oils, such as dried milk.

Definitions

As used herein the term "oxygen scavenger", "oxygen scavenging", and the like herein means or refers to a compound, composition, film layer, film, coating, plastisol, gasket, or the like which can consume, deplete or react with oxygen from a given environment.

As used herein, the phrases "sealant layer", "seal layer," "sealing layer," and "heat seal layer," refer to film layer, or layers, involved in heat sealing of the film to itself, another film layer of the same or another film, and/or another article which is not a film. Heat sealing can be performed by any one or more of a wide variety of manners, such as using a heat seal technique (e.g., melt-bead sealing, thermal sealing, impulse sealing, ultrasonic sealing, hot air, hot wire, infrared radiation, etc.). A preferred sealing method uses the same double seal bar apparatus used to make the pressure-induced seal in the examples herein. A heat seals is a relatively narrow seal (e.g., 0.02 inch to 1 inch wide) across a film.

As used herein the words "bulk layer" refer to a film layer having the primary purpose of provide extrusion stability and abuse resistance.

As used herein, the words "adhesive layer" and "tie layer" refer to any inner film layer having the primary purpose of adhering two layers to each other.

As used herein, the term "adhered" is inclusive of films which are directly adhered to one another using a heat seal or other means, as well as films which are adhered to one another using an adhesive which is between the two films.

As used herein, the term "substrate" refers to a film or layer that is adhered to another monolayer or multilayer film, e.g. through extrusion coating, adhesive, extrusion lamination or the like, and makes up part of a laminate; or alternatively is coextruded with another layer or layers; and is positionally an outer layer of the laminate or coextrudate as "outer layer" is defined herein.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces is adhered to another layer of the film. Once the multilayer film is heat sealed to itself and thereby converted into a packaging article, one outer layer of the film is an inside layer of the article and the other outer layer becomes the outside layer of the article. The inside layer can be referred to as an "outer heat seal/product contact layer". The other outer layer can be referred to as an "outer heat seal/skin layer". As used herein, the phrase "inside layer" refers to the outer layer of a multilayer film packaging a product, which is closest to the product, relative to the other layers of the multilayer film. As used herein, the phrase "outside layer" refers to the outer layer, of a multilayer film packaging a product, which is furthest from the product relative to the other layers of the multilayer film, and typically is exposed to the external environment. Likewise, the "outside surface" of a bag is the surface away from the product being packaged within the bag.

As used herein, the term "polyolefin" refers to any polymerized olefin, which can be linear, branched, cyclic, aliphatic, aromatic, substituted, or unsubstituted. More specifically, included in the term polyolefin are homo-polymers of olefin, co-polymers of olefin, co-polymers of an olefin and an non-olefinic co-monomer co-polymerizable with the olefin, such as vinyl monomers, modified polymers thereof, and the like. Specific examples include polyethylene homo-polymer, polypropylene homo-polymer, polybutene homo-polymer, ethylene-alpha-olefin which are copolymers of ethylene with one or more -olefins (alpha-olefins) such as butene-1, hexene-1, octene-1, or the like as a comonomer, and the like, propylene-alpha-olefin co-polymer, butene-alpha-olefin co-polymer, ethylene-unsaturated ester co-polymer, ethylene-unsaturated acid co-polymer, (e.g. ethylene-ethyl acrylate co-polymer, ethylene-butyl acrylate co-polymer, ethylene-methyl acrylate co-polymer, ethylene-acrylic acid co-polymer, and ethylene-methacrylic acid co-polymer), ethylene-vinyl acetate copolymer, ionomer resin, polymethylpentene, etc.

The phrase "ethylene-homopolymer" as used therein refers to ethylene homopolymer such as low density polyethylene. Examples of ethylene homopolymer are MB50-802 obtainable by Dow Corning and 10414-08 obtainable by Colortech.

The phrase "ethylene-alpha-olefin copolymer" as used herein, refers to heterogeneous and to homogeneous polymers such as linear low density polyethylene (LLDPE) with a density usually in the range of from about 0.900 g/cm$^3$ to about 0.930 g/cm$^3$, linear medium density polyethylene (LMDPE) with a density usually in the range of from about 0.930 g/cm$^3$ to about 0.945 g/cm$^3$, and very low and ultra low density polyethylene (VLDPE and ULDPE) with a density lower than about 0.915 g/cm$^3$, typically in the range 0.868 to 0.915 g/cm$^3$, and such as, EXACT™ and EXCEED™ obtainable from Exxon, AFFINITY™ obtainable from Dow, TAFMER™ obtainable from Mitsui and ATTANE™ obtainable by Dow. All these materials generally include co-polymers of ethylene with one or more co-monomers selected from $(C_4-C_{10})$-alpha-olefin such as butene-1, hexene-1, octene-1, etc., in which the molecules of the copolymers comprise long chains with relatively few side chain branches or cross-linked structures.

As used herein the term "ionomer" refers to the products of polymerization of ethylene with an unsaturated organic acid, and optionally also with an unsaturated organic acid $(C_1-C_4)$-alkyl ester, partially neutralized with a mono- or divalent metal ion, such as lithium, sodium, potassium, calcium, magnesium and zinc. Typical unsaturated organic acids are acrylic acid and methacrylic acid which are thermally stable and commercially available. Unsaturated organic acid $(C_1-C_4)$-alkyl esters are typically (meth)acrylate esters, e.g. methyl acrylate and isobutyl acrylate. Mixtures of more than one unsaturated organic acid comonomer and/or more than one unsaturated organic acid (C1-C4)-alkyl ester monomer can also be used in the preparation of the ionomer.

As used herein, the phrase "modified polymer", as well as more specific phrases such as "modified ethylene/vinyl acetate copolymer", and "modified polyolefin" refer to such polymers having an anhydride functionality grafted thereon and/or copolymerized therewith and/or blended therewith. Preferably, such modified polymers have the anhydride functionality grafted on or polymerized therewith, as opposed to merely blended therewith. As used herein, the term "modified" refers to a chemical derivative, e.g. one having any form of anhydride functionality, such as anhydride of maleic acid, crotonic acid, citraconic acid, itaconic acid, fumaric acid, etc., whether grafted onto a polymer, copolymerized with a polymer, or blended with one or more polymers, and is also inclusive of derivatives of such functionalities, such as acids, esters, and metal salts derived therefrom. As used herein, the phrase "anhydride-containing polymer" and "anhydride-modified polymer", refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, terms identifying polymers, such as "polyamide", "polyester", etc. are inclusive of not only polymers comprising repeating units derived from monomers known to polymerize to form a polymer of the named type, but are also inclusive of comonomers, derivatives, etc.

which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein the term "polyamide" refers to high molecular weight polymers having amide linkages along the molecular chain, and refers more specifically to synthetic polyamides such as nylons. Such term encompasses both homo-polyamides and co-(or ter-) polyamides. It also specifically includes aliphatic polyamides or co-polyamides, aromatic polyamides or co-polyamides, and partially aromatic polyamides or co-polyamides, modifications thereof and blends thereof. The homo-polyamides are derived from the polymerization of a single type of monomer comprising both the chemical functions which are typical of polyamides, i.e. amino and acid groups, such monomers being typically lactams or amino acids, or from the polycondensation of two types of polyfunctional monomers, i.e. polyamines with polybasic acids. The co-, ter-, and multi-polyamides are derived from the copolymerization of precursor monomers of at least two (three or more) different polyamides. As an example in the preparation of the co-polyamides, two different lactams may be employed, or two types of polyamines and polyacids, or a lactam on one side and a polyamine and a polyacid on the other side. Exemplary polymers are polyamide 6, polyamide 6/9, polyamide 6/10, polyamide 6/12, polyamide 11, polyamide 12, polyamide 6/12, polyamide 6/66, polyamide 66/6/10, modifications thereof and blends thereof. Said term also includes crystalline or partially crystalline, aromatic or partially aromatic polyamides.

The term "polyester" is used herein to refer to both homo- and co-polyesters, wherein homo-polyesters are defined as polymers obtained from the condensation of one dicarboxylic acid with one diol and co-polyesters are defined as polymers obtained from the condensation of one or more dicarboxylic acids with one or more diols. Suitable polyester resins are, for instance, polyesters of ethylene glycol and terephthalic acid, i.e. poly(ethylene terephthalate) (PET). Preference is given to polyesters which contain ethylene units and include, based on the dicarboxylate units, at least 90 mol %, more preferably at least 95 mol %, of terephthalate units. The remaining monomer units are selected from other dicarboxylic acids or diols. Suitable other aromatic dicarboxylic acids are preferably isophthalic acid, phthalic acid, 2,5-, 2,6- or 2,7-naphthalenedicarboxylic acid. Of the cycloaliphatic dicarboxylic acids, mention should be made of cyclohexanedicarboxylic acids (in particular cyclohexane-1,4-dicarboxylic acid). Of the aliphatic dicarboxylic acids, the ($C_3$-$C_{19}$)alkanedioic acids are particularly suitable, in particular succinic acid, sebacic acid, adipic acid, azelaic acid, suberic acid or pimelic acid.

Suitable diols are, for example aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings.

Co-polyester resins derived from one or more dicarboxylic acid(s) or their lower alkyl (up to 14 carbon atoms) diesters with one or more glycol(s), particularly an aliphatic or cycloaliphatic glycol may also be used as the polyester resins for the polyester base film. Suitable dicarboxylic acids include aromatic dicarboxylic acids such as terephthalic acid, isophthalic acid, phthalic acid, or 2,5-, 2,6- or 2,7-naphthalenedicarboxylic acid, and aliphatic dicarboxylic acids such as succinic acid, sebacic acid, adipic acid, azelaic acid, suberic acid or pimelic acid. Suitable glycol(s) include aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol. Examples of such copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol; (iv) co-polyesters of ethylene glycol, terephthalic acid and isophthalic acid. Suitable amorphous co-polyesters are those derived from an aliphatic diol and a cycloaliphatic diol with one or more, dicarboxylic acid(s), preferably an aromatic dicarboxylic acid. Typical amorphous co-polyesters include co-polyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65. Examples of polyester are Toppan™ obtainable by Toppan, FlexPet™ obtainable from Flex America.

As used herein, the phrase "styrene-based polymer" refers to at least one polymer selected from the group consisting of polystyrene, styrene-ethylene-butylene-styrene copolymer, styrene-butadiene-styrene copolymer, styrene-isoprene-styrene copolymer, styrene-ethylene-butadiene-styrene copolymer, and styrene-(ethylene-propylene rubber)-styrene copolymer. As used herein the use of a "dash" (i.e., the "-") in a styrene-based polymer formula, is inclusive of both block copolymers and random copolymers. More particularly, the phrase "styrene-based polymer" includes both copolymers in which (i) all named monomers are present as a block, or (ii) any subset of the named monomers are present as a block with the remaining monomers being randomly arranged, or (iii) all named monomers are randomly arranged.

The term "polystyrene" as used herein refers to film grade homopolymers and copolymers of styrene and its analogs and homologs, including -methyl-styrene and ring-substituted styrenes, such as for instance ring-methylated styrenes. This term "polystyrene polymer" is used to identify single polymers or blends of different polystyrene polymers as indicated above.

Particularly preferred resins are Styrolux 684D by BASF, Polystyrol 143E by BASF and K resin KR53 by Chevron Phillips Chemicals which can be used either alone or in blend.

"Trigger" and the like herein means that process defined in U.S. Pat. No. 5,211,875, whereby oxygen scavenging is initiated (i.e. activated) by subjecting an article such as a film to actinic radiation, having a wavelength of less than about 750 nm at an intensity of at least about 1.6 mW/cm2 or ionizing radiation such as an electron beam at a 5 dose of at least 0.2 megarads (MR), or gamma radiation, wherein after initiation the oxygen scavenging rate of the article is at least about 0.05 cc oxygen per day per gram of oxidizable organic compound for at least two days after oxygen scavenging is initiated.

Thus, "trigger" refers to subjecting an article to actinic radiation as described above; "triggered" refers to an article that has been subjected to such actinic radiation.

"Initiation" refers to the point in time at which oxygen scavenging actually begins or is activated; and "induction time" refers to the length of time, if any, between triggering and initiation. The onset of oxygen scavenging can be measured by any convenient means such as a reduction in headspace oxygen concentration, or an increase in barrier property as in the case of an active oxygen barrier system. A method offering a short "induction time" (the time that elapses, after exposing the oxygen scavenging component to a source of actinic radiation, before the oxygen scavenging activity begins) is useful in situations where the oxygen scavenging component is desirably activated at or immediately prior to use. Triggering can thus occur during filling and sealing of a container, which is made wholly or partly from the article, and containing an oxygen sensitive material.

"Photoinitiator" means a substance which, when activated by actinic radiation, enhances and/or facilitates the initiation of one or more properties (e.g., oxygen scavenging) in another compound, thus resulting in a shorter induction time and/or an increase in the rate of oxygen uptake of the overall system.

"Antioxidant" means a material which can inhibit oxidative degradation and/or crosslinking of a polymer so as to, for example, prolong the useful lifetime of the polymer, to stabilize a polymer-containing composition during processing (e.g., extrusion, coating, lamination, etc.); and/or to prolong the shelf-life of the composition (prior to exposure thereof to actinic or e-beam radiation).

All compositional percentages used herein are presented on a "by weight" basis, unless designated otherwise.

DETAILED DESCRIPTION OF INVENTION

In one aspect, the present invention is a multilayer oxygen scavenging film comprising:
A) a first outer sealant layer, optionally comprising at least one odour absorber,
B) at least one oxygen scavenging layer,
C) at least one bulk layer,
D) at least one adhesive layer, and
E) a second outer substrate layer comprising a material selected from polyester, aromatic polyester, and PET, wherein
said at least one oxygen scavenging layer B) comprises a blend of ethylene/methyl acrylate/cyclohexene methyl acrylate copolymer (EMCM) as oxygen scavenger resin and a catalyst in a carrier resin, and
said second outer substrate layer E) has a thickness greater than 5% with respect to the total thickness of the film.

Suitable catalysts used in said blend are transition metals that can readily interconvert between at least two oxidation states. The catalyst can be in the form of a transition metal salt, compound or complex, with the metal selected from the first, second or third transition series of the Periodic Table. The oxidation state of the metal when introduced is not necessarily that of the active form The metal preferably is Rh, Ru, or one of the elements in the series of Sc to Zn (i.e., Sc, Ti, V, Cr, Mn, Fe, Co, Ni, Cu, and Zn), more preferably at least one of Ti, Mn, Fe, Co, Ni, and Cu, and most preferably Ti and Co. Suitable anions for such metals include, but are not limited to, chloride, acetate, oleate, stearate, palmitate, caprylate, linoleate, tallate, 2-ethylhexanoate, neodecanoate, and naphthenate as well as their mixtures. Representative salts include cobalt (II) 2-ethylhexanoate, cobalt oleate, cobalt stearate and cobalt (II) neodecanoate, as well as titanium alkoxydes such as titanium (IV) isopropoxide. The metal salt may also be an ionomer, in which case a polymeric counterion is employed. Such ionomers are well known in the art.

Suitable carrier resins are polyester carrier resins such as ethylene vinyl acetate (EVA) or ethylene methyl acrylate (EMA).

Optionally, said blend may further comprise a photoinitiator.

Suitable photoinitiators are known to those skilled in the art., see e.g., PCT publication WO97/07161, WO97/44364, WO98/51758, and WO98/51759, the teaching of which are incorporated herein by reference. Specific examples of suitable photoinitiators include, but are not limited to, benzophenone, and its derivatives, such as methoxybenzophenone, dimethoxybenzophenone, dimethylbenzophenone, diphenoxybenzophenone, allyloxybenzophenone, diallyloxybenzophenone, dodecyloxybenzophenone, dibenzosuberone, 4,4'-bis(4-isopropylphenoxy)benzophenone, 4-morpholinobenzophenone, 4-aminobenzophenone, tribenzoyl triphenylbenzene, tritoluoyl triphenylbenzene, 4,4'-bis(dimethylamino)-benzophenone, acetophenone and its derivatives, such as, o-methoxy-acetophenone, 4'-methoxyacetophenone, valerophenone, hexanophenone, a-phenyl-butyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones, a-tetralone, acenaphthenequinone, 9-acetylphenanthrene, 2-acetyl-phenanthrene, 10-thioxanthenone, 3-acetylphenanthrene, 3-acetylindole, 9-luorenone, 1-indanone, 1,3, 5-triacetylbenzene, thioxanthen-9-one, isopropylthioxanthen-9-one, 3 xanthene-9-one, 7-H-benz[de]anthracen-7-one, 1'-acetonaphthone, 4 2'-acetonaphthone, acetonaphthone, benz[de]anthracen-7-one, 1'-acetonaphthone, 2'-acetonaphthone, acetonaphthone, benz[a]anthracene-7,12-dione, 2,2-dimethoxy-2-henylacetophenone, a,a-diethoxyacetophenone, a,a-dibutoxyacetophenone, 4-benzoyl-4'-methyl(diphenyl sulfide) and the like. Single oxygen-generating photosensitizers such as Rose Bengal, methylene blue, and tetraphenylporphine as well as polymeric initiators such as poly(ethylene carbon monoxide) and oligo[2-hydroxy-2-methyl-1-[4-(1-methylvinyl)phenyl]propanone] also can be used. The photoinitiator if present, may be carried on a polyester resin. When a photoinitiator is present, it can enhance and/or facilitate the initiation of oxygen scavenging by the oxygen scavenger blend upon exposure to radiation. When actinic radiation is used, photoinitiators can provide initiation at longer wavelengths which are less costly to generate and present less harmful side effects than shorter wavelengths. Oxygen scavenging can be initiated by exposing an article containing the oxygen scavenger blend to actinic or electron beam radiation, as described below.

One or more antioxidants can be optionally incorporated into said blend to retard degradation of its components during compounding and film formation.

Suitable antioxidants used in said blend include, but are not limited to, 2,6-di(t-butyl)-4-methylphenol (BHT), 2,2'-methylene-bis(6-t-butyl-p-cresol), triphenylphosphite, tris-(nonylphenyl)phosphite, dilauryithiodipropionate, vitamin E (a-tocopherol), octadecyl 3,5,-di-tert-butyl-4-hydroxyhydrocinnamate, tetrakis[methylene(3, 5-di-tert-butyl-4-hydroxyhydrocin namate)] methane and the like. When an antioxidant is included as part of the blend, the amount preferably is less than that which interferes with the scavenging activity of the resultant layer, film, or article after initiation has occurred. The amount needed in a given oxygen scavenger blend can depend on the components present therein, the particular antioxidant used, the degree and amount of thermal processing used to form the shaped article, and the dosage and wavelength of radiation applied to initiate oxygen scavenging.

Other additives that also can be included in said blend include, but are not necessarily limited to, fillers, pigments, dyestuffs, processing aids, plasticizers, antifog agents, antiblocking agents, and the like. The mixing of the components listed above can be accomplished by melt blending at a temperature in the range of 50° C. to 300° C. However, alternatives such as the use of a solvent followed by evaporation may also be employed.

The amounts of the components used in the blend affect the use and effectiveness of the blend itself. Thus, the amounts of the oxygen scavenger component (EMCM), catalyst, and anyone of photoinitiator, antioxidant, polymeric diluent(s), additive(s), etc. if any, can vary depending on the desired packaging article and its end use. For example, one of the primary functions of the oxygen scavenger component is to react irreversibly with oxygen during the scavenging process, while a primary function of the catalyst is to facilitate this process. Thus, to a large extent, the amount of the oxygen scavenger component affects the oxygen scavenging capacity of the packaging article, i.e., the amount of oxygen that the layer can consume, while the amount of catalyst affects the rate at which oxygen is consumed as well as the induction period.

The amount of EMCM contained in the blend can range from about 1 to almost about 100%, such as from about 5 to about 97.5%, from about 10 to about 95%, from about 15 to about 92.5%, and from about 20 to about 90%, with all the foregoing percentages being by weight of the blend or layer made therefrom.

Typically, the amount of catalyst can range from 0.001 to 1% by wt. of the total weight of the blend, based on the metal content only (i.e., excluding ligands, counterions, etc.).

The amount of photoinitiator, if present, can depend on the amount and type of cyclic unsaturation present in the oxygen scavenger component, the wavelength and intensity of radiation used, the nature and amount of antioxidants used, and the type of photoinitiator used. The amount of the photoinitiator, if present, may range from about 0.01 to about 10% by wt. of the total weight of the blend.

The antioxidant(s), if present, can be used in an amount of from about 0.01 to about 1% by wt. of the total weight of the composition.

Any further additives employed, if present, normally do not make up more than 10%, preferably no more than about 5% by weight of the total weight of the blend.

The multilayer oxygen scavenging film of the present may comprise from 1 to 5, preferably from 1 to 3, more preferably one oxygen scavenging layer(s).

In one embodiment, said at least one oxygen scavenging layer comprises a blend of from about 15 to about 5% of a catalyst in a carrier resin and from about 85 to about 95% of EMCM; such as a blend of about 10% of a catalyst in a carrier resin and about 90% of EMCM.

Said catalyst carrier resin in one embodiment comprises ethylene vinyl acetate copolymer (EVA) or ethylene methyl acrylate copolymer (EMA).

In one embodiment, said catalyst comprises cobalt oleate or cobalt (II) neodecanoate.

Polymers that may be used for the first outer sealant layer include any resin typically used to formulate packaging films with heat seal properties such as polyolefin copolymers including ethylene polymer or copolymer, ethylene/alpha olefin copolymers, ethylene/vinyl acetate copolymer, ionomer resin, ethylene/acrylic acid or methacrylic acid copolymer, ethylene/acrylate or methacrylate copolymer, or blends of any of these materials. Preferably the sealant layer of the invention comprises very low density ethylene/alpha olefin copolymer and low density polyethylene homopolymer. More preferably the sealant layer comprises very low density ethylene/butene copolymer and low density polyethylene homopolymer.

In one embodiment said first outer sealant layer comprises at least an odour absorber agent.

Suitable odour absorber agents are zeolites, metal oxides, such as zinc oxide and magnesium oxide, or a mixture thereof. Said agents are preferably carried on a resin to produce a masterbatch. Suitable resins that may be used in the odour absorber masterbatch are the same listed with reference to the sealant layer above. Preferred resins used in said masterbatch are ethylene polymer and copolymer and ethylene/alpha olefin copolymers. More preferred polymers are low density ethylene/hexene copolymer, low density ethylene/octene copolymer, propylene/ethylene copolymer, low density polyethylene or very low density polyethylene. The percentage of the at least an odour absorber agent is preferably from about 20 to about 40% in weight of the total weight of the masterbatch, according to the quantities of Volatile Compounds (VOCs) generated by the oxygen scavenging chemistry to be scavenged and removed.

In one embodiment the sealant layer comprises one odour adsorber masterbatch, comprising a zeolite and optionally zinc oxide and/or magnesium oxide; preferably, the first outer sealant layer comprises from about 5 to about 15% by weight of a masterbatch comprising a zeolite, zinc oxide and magnesium oxide.

In another embodiment the sealant layer comprises two odour adsorber masterbatches, one comprising a zeolite and zinc oxide and the other comprising a zeolite; preferably, the first outer sealant layer comprises from about 15 to about 25% by weight of a masterbatch comprising a zeolite and zinc oxide and from about 5 to about 20% by weight of a masterbatch comprising a zeolite.

In another embodiment the first outer sealant layer comprises at least an antiblock agent.

Suitable antiblock agents that may be used in the present films are ceramic spheres (beads)—alkali-alumino-silicate ceramic. Said agents can be carried on a resin to produce a masterbatch. The percentage of the at least an antiblock agent is preferably from about 5 to about 15% in weight of the total weight of the masterbatch. Suitable resins that may be used in antiblock masterbatch are the same listed with reference to the sealant layer above. In one embodiment, the sealant layer comprises from about 5 to about 15% by weight a masterbatch comprising ceramic spheres (beads)—alkali-alumino-silicate ceramic.

In another embodiment the first outer sealant layer does not comprise nor an odour absorber agent nor an antiblock agent.

Polymers that may be used for the at least one bulk layer are the same listed with reference to the sealant layer above.

In one embodiment said at least one bulk layer comprises at least an odour absorber agent, optionally carried on a resin to produce a masterbatch. Suitable odour absorber agents and suitable resins to produce a masterbatch are the same listed above.

The multilayer oxygen scavenging film of the present may comprise from 1 to 5, such as from 1 to 3, such as one bulk layer(s).

The at least one adhesive layer is disposed between the respective layers in case a sufficient adhesion is not ensured between adjacent layers. The adhesive is selected for adhesion, flexibility, and favorable organoleptic properties as required so that the resultant film is substantially free of wrinkles, exhibits good flatness, and has the appropriate coefficient of friction (COF) for winding, slitting and final converting processes.

Polymers that may be used for the adhesive layer are selected among the group consisting of one or more polyolefins, one or more modified polyolefins and a blend of the above. Specific, not limitative, examples thereof include ethylene-vinyl acetate copolymers, ethylene-(meth)acrylate copolymers, ethylene-alpha-olefin copolymers, any of the above modified with carboxylic or preferably anhydride functionalities, elastomers, and a blend of these resins.

Suitable resins are ADMER NF 538E by Mitsui Chemical, Plexar PX3227X09 or Plexar PX3227 by Lyondell Basell, OREVAC 18211 by Arkema and BYNEL 3101, Bynel 39E660 or Bynel CXA21E6787 by DuPont. Other suitable adhesive resins are blend of isocyanate aromatic and polyol-polyester coreactant such as PURELAM™ supplied by Ashland. Other adhesive resins are blends of polyol-polyester coreactant, ethyl acetate and isocyanate-aromatic isocyanate, such as those supplied by Dow Chemical and ethyl acetate supplied by Eastman Chemical.

The multilayer oxygen scavenging film of the present may comprise from 1 to 5, such as from 1 to 3, such as one adhesive layer(s).

Polymers that may be used for the second outer substrate layer are selected from the group consisting of polyamides, polyesters and styrene-based (co)polymers. Blends of such classes of resins can be used. For example, polyesters of ethylene glycol and terephthalic acid, i.e. poly(ethylene terephthalate) (PET) are used; optionally PET may be coated with a metal oxide, such as aluminum oxide or silicon oxide. Preferably the polyester is 100% PET, optionally coated with aluminum oxide. In one embodiment, the substrate is printed prior to lamination.

The multilayer oxygen scavenging film of the present invention may have from 5 to 17 layers, such as 11, or 5 layers.

Preferred multilayer structures according to the present invention are:
A/B/C/D/E, A/C/B/D/E (5 layers),
A/B/C/B/D/E, A/C/B/C/D/E (6 layers),
A/B/D/C/B/D/E, A/C/D/B/C/D/E, A/D/B/C/B/D/E, (7 layers),
A/D/B/D/C/B/D/E, A/D/C/D/B/C/D/E, A/D/C/D/B/B/D/E, (8 layers),
A/D/B//BD/C/B/D/E, A/D/C/D/B/B/C/D/E, A/D/C/D/B/D/B/D/E, (9 layers),
A/C/D/B//B/D/C/B/D/E, A/C/D/C/D/B/C/D/E, A/C/D/C/D/B/D/B/D/E, (10 layers),
A/D/B/D/C/D/B/D/C/D/E, A/D/B/D/C/D/B/B/D/E (11 layers);
wherein:
A=first outer sealant layer,
B=oxygen scavenging layer,
C=bulk layer,
D=adhesive layer,
E=second outer substrate layer.

In one embodiment the multilayer oxygen scavenging film of the present invention comprises
A) a first outer sealant layer comprising from about 5 to about 25% by weight a masterbatch comprising a zeolite and zinc oxide and from about 5 to about 15% by weight a masterbatch comprising a zeolite;
B) one oxygen scavenging layer comprising a blend of from about 15 to about 5% of a catalyst in a carrier resin and from about 85 to about 95% of EMCM, wherein the catalyst is cobalt oleate or cobalt (II) neodecanoate and the catalyst carrier resin is ethylene methyl acrylate copolymer (EMA);
C) one bulk layer comprising from about 10 to about 50% by weight of very low density ethylene/butene copolymer, from about 50 to about 90% by weight of low density polyethylene homopolymer;
D) one adhesive layer comprising a binary blend of from about 48 to about 58% by weight of isocyanate-aromatic and from about 42 to 52% by weight of polyol-polyester coreactant or a ternary blend of from about 3 to about 13% by weight of polyol-polyester coreactant, from about 48 to 58% by weight of ethyl acetate and from about 34 to about 44% by weight of isocyanate-aromatic isocyanate;
E) a second outer substrate layer comprising PET, optionally aluminum oxide coated, having a thickness greater than 5% with respect to the total thickness of the film.

In another embodiment the multilayer oxygen scavenging film of the present invention comprises
A) a first outer sealant layer optionally comprising from about 5 to about 15% by weight a masterbatch comprising a zeolite, zinc oxide and magnesium oxide;
B) one oxygen scavenging layer comprising a blend of from about 15 to about 5% of a catalyst in a carrier resin and from about 85 to about 95% of EMCM, wherein the catalyst is cobalt oleate or cobalt (II) neodecanoate and the catalyst carrier resin is ethylene methyl acrylate copolymer (EMA);
C) one bulk layer comprising from about 5 to about 15% by weight a masterbatch comprising a zeolite, from about 25 to about 35% by weight of very low density ethylene/butene copolymer, from about 70 to about 50% by weight of low density polyethylene homopolymer;
D) one adhesive layer comprising a binary blend of from about 48 to about 58% by weight of isocyanate-aromatic and from about 42 to mm % by weight of polyol-polyester coreactant or a ternary blend of from about 3 to about 13% by weight of polyol-polyester coreactant, from about 48 to 58% by weight of ethyl acetate and from about 34 to about 44% by weight of isocyanate-aromatic isocyanate;
E) a second outer substrate layer comprising PET, optionally aluminum oxide coated, having a thickness greater than 5% with respect to the total thickness of the film.

In another embodiment the multilayer oxygen scavenging film of the present invention comprises
A) a first outer sealant layer comprising from about 5 to about 15% by weight a masterbatch comprising ceramic spheres (beads)—alkali-alumino-silicate ceramic;
B) one oxygen scavenging layer comprising a blend of from about 15 to about 5% of a catalyst in a carrier resin and from about 85 to about 95% of EMCM, wherein the catalyst is cobalt oleate or cobalt (II) neodecanoate and the catalyst carrier resin is ethylene methyl acrylate copolymer (EMA);
C) one bulk layer comprising from about 10 to about 50% by weight of very low density ethylene/butene copolymer, from about 50 to about 90% by weight of low density polyethylene homopolymer;

D) one adhesive layer comprising a binary blend of from about 48 to about 58% by weight of isocyanate-aromatic and from about 42 to mm % by weight of polyol-polyester coreactant or a ternary blend of from about 3 to about 13% by weight of polyol-polyester coreactant, from about 48 to 58% by weight of ethyl acetate and from about 34 to about 44% by weight of isocyanate-aromatic isocyanate;

E) a second outer substrate layer comprising PET, optionally aluminum oxide coated, having a thickness greater than 5% with respect to the total thickness of the film.

The total thickness of the film of the present invention may vary within wide limits, e.g. from 10 to 100 microns, such as from 5 to 80 microns, 8 to 70 microns, and from 15 to 70 microns.

The thickness of the at least one oxygen scavenging layer may vary within wide limits, e.g. from 10 to 30 microns, and from 15 to 25 microns. The at least one oxygen scavenging layer may represent about from 10 to about 47% of the total thickness of the film; such as about from 23 to about 39%; or about 30%.

The thickness of the second outer substrate layer may vary within wide limits, e.g. from 10 to 30 microns, and from 15 and 25 micron. The second outer substrate layer may represent about from 6 to about 47% of the total thickness of the film; such as from 10 to about 39%; or about 20%.

One or more of the layers of the film of the present invention may contain any of the additives conventionally employed in the manufacture of polymeric films. Thus, agents such as pigments, lubricants, anti-oxidants, radical scavengers, UV absorbers, thermal stabilisers, anti-blocking agents, surface active agents, slip aids, optical brighteners, gloss improvers, viscosity modifiers may be incorporated as appropriate. In particular, to improve the processing of the film in high speed packaging equipment, slip and/or anti-blocking agents may be added to one or both of the surface layers. The additives may be added in the form of a concentrate in a polyester carrier resin. The amount of additive is typically in the order of 0.2 to 5% by weight of the total weight of the layer.

Multilayer films of the invention can be made using conventional extrusion, coextrusion, and/or lamination processes. Likewise, conventional manufacturing processes can be used to make a pouch, a bag, or other container from the film. Hermetic sealing of a pouch, bag, or other container made from the film of the invention will typically be preferable. The exact requirements of a container made from the film will depend on a variety of factors, including the chemical nature of the oxygen scavenger, amount of the oxygen scavenger, concentration of the oxygen scavenger in a host material or diluent, physical configuration of the oxygen scavenger, presence of hermetic sealing, vacuumization and/or modified atmosphere inside the container, initial oxygen concentration inside the container, intended end use of the oxygen scavenger, intended storage time of the container before use, level of initial dose of actinic radiation, etc.

Another aspect of the present invention is a process for the manufacture of a film according to the first aspect of the present invention.

Multilayer films of the present invention typically are prepared using coextrusion, extrusion coating, lamination or extrusion/lamination as taught in, for example, U.S. Pat. Nos. 5,350,622 and 5,529,833, the teachings of which are incorporated herein by reference.

The process of the present invention also includes exposing the film according to the first aspect of the present invention to radiation so as to initiate oxygen scavenging at desired rates. The thermal radiation used in heating and processing polymers typically used in packaging films (e.g., 100-250° C.) advantageously does not trigger the oxygen scavenging reaction. The initiating radiation preferably is actinic, e.g., UV or visible light having a wavelength of from about 200 to about 750 nm, preferably of from about 200 4 to 600 nm, and most preferably from about 200 to 400 nm. Such light can be delivered in a continuous or pulsed manner. The film of the invention can be exposed to such radiation until it receives at least about 1 J/g of radiation, such as a dose in the range of about 10 to about 2000 J/g. The radiation also can be in the form of electron-beam radiation at a dosage of at least about 2 kiloGray 10 (kG), such as from about 10 to about 100 kG. Other potential sources of radiation include ionizing radiation such as gamma, X-ray, and corona discharge. Duration of exposure depends on several factors including, but not limited to, the amount and type of photoinitiator present, thickness of the layers to be exposed, thickness and opacity of intervening layers, amount of any antioxidant present, and the wavelength and intensity of the radiation source. Irradiation can occur during or after the film is prepared. If the resulting film is to be used to package an oxygen sensitive product, exposure can be just prior to, during, or after packaging. For best uniformity of radiation, exposure preferably occurs at a processing stage where the film is in the form of a flat sheet. For further information on initiation via irradiation, the reader is directed to PCT publications WO 98/05555 and WO 98/05703, as well as WO 97/13598, 97/13370, 97/13369, the teachings of which are incorporated herein by reference.

The process described above assumes all processing steps plus the triggering can be done in the same location. If the triggering is to be accomplished at a different location, then a different process can be considered, such as activating the extruded film just after extrusion, placing the extruded film in barrier bags and shipping them to a converter. The converter can then laminate, cure, and slit the film before repackaging the film in an oxygen free environment. All these steps should be completed in as short a period as possible to enhance the scavenging capacity.

One process for the manufacture of the multilayer oxygen scavenging film of the present invention described above comprises the following steps:
1) coextrusion of the first outer sealant layer, the at least one odour absorber, the at least one oxygen scavenging layer and the at least one bulk layer,
2) lamination of the resultant co-extruded film with the adhesive layer to the second outer substrate layer
3) curing and,
4) optionally, irradiation.

Irradiation can be performed either on the extruded film (i.e. after step 1) or on the laminated film, after curing. Curing is typically done for a minimum of 24 hours.

In one embodiment, irradiation is accomplished using electron-beam radiation, e.g. at a dosage of at least about 2 kiloGray 10 (kG), such as from about 10 to about 100 kG.

A third aspect of the present invention is a package comprising a container, a product and a lid comprising the oxygen scavenging film of the first aspect of the present invention sealed onto said container.

Typically the surface of the container in contact with the product, i.e. the surface involved in the formation of the seal with the lidding film, comprises a polyester resin, usually an amorphous polyester resin (APET). For instance, the container can comprise a cardboard coated with polyester, or it can be integrally comprise a polyester resin. Examples of suitable containers for the package of the invention are CPET, APET, APET/CPET, either foamed or non-foamed, i.e. solid, or aluminum containers.

The package is produced by techniques well-known to those skilled in the art. Once the food to be packaged has been introduced into the container, the bi-axially oriented coated polyester film of the invention is sealed to the container by means of temperature and/or pressure using conventional sealing techniques and equipment. The film is placed on the container such that the heat-sealable coating is in contact with the surface of the container. Sealing is carried out by means of a heated frame at temperatures of from 100° C. to 200° C., 120° C. to 200° C. at a pressure of 2 to 10 bar, 4 to 8 bar. Sealing times are typically in the order of 0.3 to 2.0 seconds, 0.5 to 1.0 seconds. The heat generated by the sealing frame, regardless of the short sealing times, promotes the shrinkage of the film in both directions without distortion of the container to give a taut hermetically sealed lid. No film excess is needed to seal the container as the shrink of the film takes place only after the film is tightly held between the sealing frame and the rim of the container.

A fourth aspect of the present invention is a bag, or pouch or multi-compartment tray-less package made of the oxygen scavenging film of the first aspect of the present invention sealed onto itself. A common method of forming said bags, or pouches or multi-compartment tray-less packages is by means of form-fill-seal (FFS) machines, such as a horizontal form-fill-seal (HFFS) or a vertical form-fill seal (VFFS) machine.

A FFS machine, either horizontal or vertical, typically includes a former for forming a flat web of film into a tubular configuration, a longitudinal sealer to seal the overlapped longitudinal edges of the film in the tubular configuration, a conveyor for feeding the products into the tubular film one after the other in suitably spaced configuration, or a feeding tube in case of a VFFS machine, and a transverse sealer for sealing the tubular film in a cross-wise direction to separate the products into discrete packages.

The transverse sealer may be operated to simultaneously seal the bottom of the leading pouch and the front of the following pouch and sever the two seals as well as the leading package from the front sealed tubing.

In the HFFS process, a method of making a package comprises:
providing a lay-flat web;
advancing the lay-flat web to a forming device to convert the lay-flat web into a folded web;
advancing a food product to the forming device such that the folded web envelopes the product;
longitudinally sealing the folded web to make a longitudinal seal;
transversely sealing the folded web, with the product therein, to produce a leading transverse seal to define a first pouch;
advancing the folded web, with the leading transverse seal, forward a predetermined distance;
transversely sealing the folded web to produce a trailing transverse seal in the first pouch, and a leading transverse seal in a second pouch, the second pouch disposed upstream of the first pouch; and
cutting the folded web to separate the first pouch from the second pouch to form an individual package. In the FFS processes, while the transverse seals are always fin seals, the longitudinal seal can be either a fin seal or a lap seal, i. e. a seal where the heat sealable layer of the film is sealed to the outermost layer of the same film.

The outermost or external layer is selected for its heat resistance during the sealing step. For example, it is advantageous to select for this layer a polymer having a melting point higher than the sealing temperature.

The bag, pouch or multi-compartment tray-less package can be irradiated in case the oxygen scavenging film has not been irradiated during its manufacturing, in order to initiate oxygen scavenging. The packages described above have wide applications, including for food packaging, such as for, dried milk, meat and cheese, smoked and processed luncheon meats.

When the product will be loaded into, for example, a bag made of the film of the invention, its open end will be closed by heat-sealing or by applying a clip, e.g. of metal.

A fifth aspect of the present invention is a bag, a pouch or multi-compartment tray-less package made of the oxygen scavenging film of the first aspect of the present invention sealed onto itself and containing the product.

A sixth aspect of the present invention is the use of the oxygen scavenging film according to the first aspect of the present invention for packaging food, in particular for food containing oxygen sensitive unsaturated oils, such as dried milk.

The multilayer oxygen scavenging film for use according to the sixth aspect of the present invention comprises in one embodiment:
A) a first outer sealant layer comprising from about 5 to about 25% by weight a masterbatch comprising zeolite and zinc oxide from about 5 to about 15% by weight a masterbatch comprising zeolite;
B) an oxygen scavenging layer comprising a blend of from about 15 to about 5% by weight of a catalyst in a carrier resin and from about 85 to about 95% by weight of EMCM, wherein the catalyst is cobalt oleate or cobalt (II) neodecanoate and the catalyst carrier resin is ethylene methyl acrylate (EMA);
C) a bulk layer comprising from about 10 to about 50% by weight of very low density ethylene/butene copolymer, from about 50 to about 90% by weight of low density polyethylene homopolymer;
D) an adhesive layer comprising a binary blend of from about 48 to about 58% by weight of isocyanate-aromatic and from about 42 to 52% by weight of polyol-polyester coreactant or a ternary blend of from about 3 to about 13% by weight of polyol-polyester coreactant, from about 48 to 58% by weight of ethyl acetate and from about 34 to about 44% by weight of isocyanate-aromatic isocyanate; and
E) a second outer substrate layer comprising PET, optionally coated with aluminum oxide and having a thickness greater than 5% with respect to the total thickness of the film.

EXAMPLES

The present invention can be further understood by reference to the following examples that are merely illustrative and are not to be interpreted as a limitation to the scope of the present invention that is defined by the appended claims.

In the following examples the polymers indicated in Table 1 below have been employed.

TABLE 1

| | | | | Polymers | | |
|---|---|---|---|---|---|---|
| | | | | | Parameters | |
| Tradename | Supplier | Chemical Nature | Acronym/Name | Analysis | Value | Units |
| EXACT 3024 | ExxonMobil | Polyethylene, Very Low Density Ethylene/Butene Copolymer - Linear, Single Site | VLDPE1 | Density | 0.905 | $g/cm^3$ |
| | | | | Melt Flow Rate (Cond. 190° C./ 02.16 kg (E)) | 4.50 | g/10 min |
| | | | | Melting Point | 97 | ° C. |
| | | | | Vicat softening point | 87 | ° C. |
| | | | | Crystallization point | 82 | ° C. |
| AFFINITY PL 1850G | DOW | Polyethylene, Very Low Density Ethylene/Octene Copolymer - Branched, Single Site | VLDPE2 | Comonomer content | 12 | % |
| | | | | Density | 0.9020 | $g/cm^3$ |
| | | | | Melt Flow Rate (Cond. 200° C./ 02.16 kg) | 3 | g/10 min |
| | | | | Melting Point | 97 | ° C. |
| | | | | Vicat softening point | 85 | ° C. |
| ATTANE 4203 | DOW | Polyethylene, Very Low Density Ethylene/Octene Copolymer - Linear, Ziegler/Natta | VLDPE3 | Additives | 200 | ppm |
| | | | | Bulk (apparent) Density | 0.53 | $g/cm^3$ |
| | | | | Comonomer content | 11.5 | % |
| | | | | Density | 0.9052 | $g/cm^3$ |
| | | | | Gel area | 0.82 | $mm^2$ |
| | | | | Melt Flow Rate (Cond. 190° C./ 02.16 kg) | 0.8 | g/10 min |
| | | | | Melt flow ratio | 8.6 | |
| | | | | Melting Point | 123 | ° C. |
| MB50-802 | Dow Corning | Polydimethylsiloxane in Polyethylene, Low Density - High Molecular Weight Siloxane | LDPE1 | Additives | 50 | % |
| | | | | Density | 1.03 | $g/cm^3$ |
| | | | | Bulk (Apparent) Density | 0.6 | $g/cm^3$ |
| | | | | Melt Flow Rate | 8.0 | g/10 min |
| 10414-08 | Colortech | Zeolite in Polyethylene, Low Density (odour absorber) | LDPE2 | Ash | 19.6 | % |
| | | | | Density | 1.02 | $g/cm^3$ |
| | | | | Melt Flow Rate (Cond. 190° C./ 02.16 kg) | 6 | g/10 min |
| Petrothene NA952000 | LyondellBasell Industries | Polyethylene Low Density Homopolymer - Free Radical | LDPE3 | Density | 0.9185 | $g/cm^3$ |
| | | | | Melt Flow Rate | 2.0 | g/10 min |
| Toppan GX-P-F | Toppan | Polyester, Biaxially Oriented - Aluminum Oxide Coated | PET1 | Density | 1.4 | $g/cm^3$ |
| | | | | Thickness | 12 | micron |
| FlexPET F-CHE | FLEX AMERICAS, S.A DE C. V. | Polyester, Biaxially Oriented; One side Chemicall/PET - | PET2 | Density | 1.4 | $g/cm^3$ |
| | | | | Thickness | 0.48 | Mils |
| FlexPET F-PLF | FLEX AMERICAS, S.A DE C. V. | Polyester, Biaxially Oriented - Aluminum Oxide Coated | PET3 | | | |
| Orrex | Orrex | Cobalt Catalyst | Oxygen | Comonomer | 23 | % |

TABLE 1-continued

Polymers

| Tradename | Supplier | Chemical Nature | Acronym/Name | Analysis | Value | Units |
|---|---|---|---|---|---|---|
| OSP110M | Plastic | in Ethylene/Methyl Acrylate Copolymer | Scavenging MB (OSMB1) | content (MethylAcrylate) | | |
| | | | | Density | 0.955 | g/cm³ |
| | | | | Melt Flow Rate | 3.5 | g/10 min |
| n.a. | in-house | Titanium catalysed Ethylene/Methyl Acrylate/Cyclohexene Methyl Acrylate Copolymer, 50% by weight EMA 50% by weight Cyclohexene units | Oxygen Scavenging MB (OSMB2) | n.a. | n.a. | n.a. |
| POLYBATCH FSU 105E | Schulman | AntiBlock and Slip in Polyethylene, Low Density | LDPE4 | Additives | 10 | % |
| | | | | Melt Flow Rate (Cond. 190° C./ 02.16 kg (E)) | 20 | g/10 min |
| | | | | Ash | 10 | % |
| | | | | Density | 0.98 | g/cm³ |
| | | | | Moisture content | 1.5 | % |
| | | | | Number Pellets | 43 | No./g |
| Polybatch AB-5 | Schulman | Silica in Polyethylene, Low Density - Amorphous Silica | LDPE5 | Melt Flow Rate (Cond. 190° C./ 02.16 kg (E)) | 17 | g/10 min |
| | | | | Density | 0.96 | g/cm³ |
| LDPE 312E | DOW | Polyethylene Low Density Homopolymer - Free Radical | LDPE6 | Melt Flow Rate (Cond. 190° C./ 02.16 kg (E)) | 0.75 | g/10 min |
| | | | | Density | 0.923 | g/cm³ |
| POLYBATCH FSU 105E | Schulman | AntiBlock and Slip in Polyethylene, Low Density | LDPE7 | Melt Flow Rate (Cond. 190° C./ 02.16 kg (E)) | 1.1 | g/10 min |
| | | | | Melting Point | 99 | ° C. |
| | | | | Density | 0.902 | g/cm³ |
| | | | | Vicat Softening point | 86 | ° C. |
| POLYBATCH AO-25 | Schulman | Primary and Secondary AO in Polyethylene, Low Density - Proprietary | LDPE8 | Density | 0.93 | g/cm³ |
| POLYBATCH AMF 702 | Schulman | Fluoropolymer in Polyethylene, Low Density | LDPE9 | Density | 0.918 | g/cm³ |
| AMPLIFY TY 1451 | DOW | Maleic Anhydride-Modified Polyethylene, Linear Low Density Blend - Rubber-Modified | LLDPE-md1 | Melt Flow Rate (Cond. 190° C./ 02.16 kg (E)) | 1.4 | g/10 min |
| | | | | Density | 0.9080 | g/cm³ |
| SOARNOL ET3803 | Nippon Gohsei | Hydrolyzed Ethylene/Vinyl Acetate Copolymer - Between 30-40 mole % Ethylene | EVOH | Comonomer content | 38.00 | % |
| | | | | Crystallization point | 58 | ° C. |
| | | | | Melting Point | 173 | ° C. |
| | | | | Density | 1.17 | g/cm³ |

TABLE 1-continued

| | | | Polymers | | | |
|---|---|---|---|---|---|---|
| | | | | | Parameters | |
| Tradename | Supplier | Chemical Nature | Acronym/Name | Analysis | Value | Units |
| | | | | Moisture Content | Max. 0.3 | % |
| LDPE 310E | DOW | Polyethylene Low Density Homopolymer - Free Radical | LDPE10 | Melt Flow Rate (Cond. 190° C./ 02.16 kg (E)) | 0.75 | g/10 min |
| | | | | Density | 0.9235 | g/cm$^3$ |
| ENGAGE 8150 | DOW | Polyethylene, Very Low Density Ethylene/Octene Copolymer - Linear, Single Site | VLDPE5 | Melt Flow Rate (Cond. 190° C./ 02.16 kg (E)) | 0.5 | g/10 min |
| | | | | Crystallization point | 42 | ° C. |
| | | | | Melting Point | 55 | ° C. |
| | | | | Density | 0.868 | g/cm$^3$ |
| | | | | Vicat softening point | 46 | ° C. |
| Engage 8402 | DOW | Polyethylene, Very Low Density Ethylene/Octene Copolymer - Branched, Single Site | VLDPE6 | Melt Flow Rate (Cond. 190° C./ 02.16 kg (E)) | 30 | g/10 min |
| | | | | Density | 0.902 | g/cm$^3$ |
| n.a. | In-House | Adhesive made by 53.27% PURELAM 9500 and 46.73% PURELAM 9240 as defined below: | ADHESIVE 2 | | | |
| PURELAM 9500 | Ashland | Isocyanate - Aromatic | | Percent NCO | Min. 19.5-Max. 21.5 | % |
| | | | | Viscosity | Min. 1800-Max. 4000 | mPa · sec |
| PURELAM 9240 | Ashland | Polyol - Polyester Coreactant | | Hydroxyl Value | 230 | mg KOH/g |
| | | | | Viscosity | 1450 | mPa · sec |
| n.a. | In-House | Adhesive made by ADCOTE 532B 8.00%, TRUE 53.00%, ADCOTE 532A 39.00% as defined below: | ADHESIVE 1 | | | |
| ADCOTE 532B | Dow Chemical | Polyol - Polyester Coreactant | | Density | 1.1260 | g/cm$^3$ |
| High Purity Ethyl Acetate | Eastman Chemical | Ethyl Acetate | | Acid Number | 0.010 | mg KOH/g |
| | | | | Density | 0.9015 | g/cm$^3$ |
| | | | | Moisture Content | 0.03 | % |
| | | | | Purity | 99.5 | % |
| ADCOTE 532A | Dow Chemical | Isocyanate - Aromatic Isocyanate | | Density | 1.0540 | g/cm$^3$ |
| n.a. | In-House | Adhesive made by HERBERTS EPS 72 EA 44.84%, HARDENER KN 75 4.94%, ETHYL ACETATE 50.22% as defined below: | ADHESIVE 3 | | | |
| HERBERTS EPS 72 EA | Bostik | Polyol - Polyester Coreactant | | Density | 1.15 | g/cm$^3$ |
| | | | | Viscosity Solution | 1800 | mPa · sec |

TABLE 1-continued

Polymers

| Tradename | Supplier | Chemical Nature | Acronym/Name | Parameters Analysis | Value | Units |
|---|---|---|---|---|---|---|
| HARDENER KN 75 | Bostik | Isocyanate - Aromatic Isocyanate | | Viscosity Solution | 1.17 | mPa · sec |
| ETHYL ACETATE | Brenntag | Ethyl Acetate | | Boiling Point Range | 80 | ° C. |
| | | | | Density | 0.8990 | g/cm³ |
| | | | | Moisture Content | max 0.1 | % |
| | | | | Purity | min 95 | % |
| | | | | Refractive Index | min 1.365 | max 1.373 |

The composition of Masterbatches 1-3 is reported in Table 2.

TABLE 2

Masterbatch composition

| % | Tradename | Supplier | Chemical Nature | Acronym | Parameters Analysis | Value | Units |
|---|---|---|---|---|---|---|---|
| | | | Masterbatch 1 | | | | |
| 25% | Exceed 1012HA | ExxonMobil | linear Low Density Ethylene/Hexene Copolymer - Linear, Single Site | LLDPE1 | density | 0.9 | g/cc |
| | | | | | melt flow rate, 190, ° C., 2.16 kg, ASTM D1238 | 1 | g/10 min |
| | | | | | melting point | 115 | ° C. |
| 25% | DOWLEX 2045.03 | DOW | Linear Low Density Ethylene/Octene Copolymer - Linear, Ziegler/Natta | LLDPE2 | density | 0.92 | g/cc |
| | | | | | melt flow rate, 190, ° C., 2.16 kg, ASTM D1238 | 1.1 | g/10 min |
| | | | | | melting point | 124.5 | ° C. |
| 25% | Z9450 | Total Petrochemicals | Propylene/Ethylene Copolymer - Single Site | EPC | density | 0.89 | g/cc |
| | | | | | melt flow rate, 230, ° C., 2.16 kg, ASTM D1238 | 5 | g/10 min |
| | | | | | melting point | 128 | ° C. |
| 20% | 10414-08 | Colortech | Zeolite in Polyethylene, Low Density (odour absorber) | LDPE2 | density | 1.02 | g/cc |
| | | | | | melt flow rate, 190, ° C., 2.16 kg, ASTM D1238 | 6 | g/10 min |
| | | | | | ash | 19.6 | % |
| 5% | IT-815 | Ingenia Polymers | Zinc Oxide in Polyethylene, Linear Low Density (odour absorber) | LLDPE3 | density | 1.17 | g/cc |
| | | | | | melt flow rate, 190, ° C., 2.16 kg, ASTM | 15 | g/10 min |

TABLE 2-continued

Masterbatch composition

| % | Tradename | Supplier | Chemical Nature | Acronym | Analysis | Value | Units |
|---|---|---|---|---|---|---|---|
| | | Masterbatch 2 | | | D1238 | | |
| 100% | n.a. | in house | 35% by weight of 13X molecular sieve zeolite in LDPE or VLDPE (odour absorber) | | density | 2.1 | g/cc |
| | | Masterbatch 3 | | | | | |
| 10% | ZEEOSPHERE W410 | 3M | Ceramic Spheres (beads) - Alkali-Alumino-Silicate Ceramic | AntiBlock | density | 2.4 | g/cc |
| 90% | Engage 8137 | Dow Chemical | Polyethylene, Very Low Density | VLDPE4 | density | 0.866 | g/cc |
| | | | | | melt flow rate, 190, ° C., 2.16 kg, ASTM D1238 | 13 | g/10 min |
| | | | | | melting point | 56 | ° C. |
| | | Masterbatch 4 | | | | | |
| 88% | SP2260 (Westlake) | Westlake Chemical | Ethylene/Methyl Acrylate Copolymer - More than 20 wt. % comonomer | EMA | density | 0.944 | g/cc |
| | | | | | melt flow rate, 190, ° C., 2.16 kg, ASTM D1238 | 2.1 | g/10 min |
| | | | | | melting point | 77 | ° C. |
| 7% | Irganox 1076 | BASF | Phenolic (primary) | Additive1 (?) | density | 1.02 | g/cc |
| | | | | | melting point | 51 | ° C. |
| 5% | Cobalt Neodecanoate | Shepherd Chemical | Cobalt Neodecanoate | Additive2 (?) | density | 1.23 | g/cc |
| | | Masterbatch 5 | | | | | |
| 42% | Exceed 1012HA | ExxonMobil | linear Low Density Ethylene/Hexene Copolymer - Linear, Single Site | LLDPE1 | density | 0.9 | g/cc |
| | | | | | melt flow rate, 190, ° C., 2.16 kg, ASTM D1238 | 1 | g/10 min |
| | | | | | melting point | 115 | ° C. |
| 35% | DOWLEX 2045.03 | DOW | Linear Low Density Ethylene/Octene Copolymer - Linear, Ziegler/Natta | LLDPE2 | density | 0.92 | g/cc |
| | | | | | melt flow rate, 190, ° C., 2.16 kg, ASTM D1238 | 1.1 | g/10 min |
| | | | | | melting point | 124.5 | ° C. |
| 23% | Z9450 | Total Petrochemicals | Propylene/Ethylene Copolymer - Single Site | EPC | density | 0.89 | g/cc |
| | | | | | melt flow rate, 230, ° C., 2.16 kg, ASTM D1238 | 5 | g/10 min |
| | | | | | melting point | 128 | ° C. |
| | | Masterbatch 6 | | | | | |

TABLE 2-continued

| | | | Masterbatch composition | | | | |
|---|---|---|---|---|---|---|---|
| | | | Chemical | Parameters | | | |
| % | Tradename | Supplier | Nature | Acronym | Analysis | Value | Units |
| 70% | 10414-08 | Colortech | Zeolite in Polyethylene, Low Density (odour absorber) | LDPE2 | density<br>melt flow rate, 190, °C., 2.16 kg, ASTM D1238<br>ash | 1.02<br>6<br><br><br><br><br>19.6 | g/cc<br>g/10 min<br><br><br><br><br>% |
| 20% | IT-748 | Ingenia Polymers | Magnesium Oxide in Polyethylene, Linear Low Density | LLDPE4 | density<br>melt flow rate, 190, °C., 2.16 kg, ASTM D1238<br>ash | 1.02<br>6<br><br><br><br><br>19.6 | g/cc<br>g/10 min<br><br><br><br><br>% |
| 10% | IT-815 | Ingenia Polymers | Zinc Oxide in Polyethylene, Linear Low Density (odour absorber) | LLDPE3 | density<br>melt flow rate, 190, °C., 2.16 kg, ASTM D1238 | 1.19<br>20 | g/cc<br>g/10 min |

The examples according to the invention have been collected in Tables 3, 4 and 5.

TABLE 3

| | | Examples | | | |
|---|---|---|---|---|---|
| | No Layer (thickness) | Ex. 1 | Ex. 2 | Ex. 3 | Ex. 4 |
| 3-layers barrier laminate (50.9μ) | layer 1 (10.2μ) | VLDPE1 66.00%<br>LDPE1 4.00%<br>MASTERBATCH1 25.00%<br>MASTERBATCH2 5.00% | VLDPE1 66.00%<br>LDPE1 4.00%<br>MASTERBATCH1 25.00%<br>MASTERBATCH2 5.00% | VLDPE1 66.00%<br>LDPE1 4.00%<br>MASTERBATCH1 25.00%<br>MASTERBATCH2 5.00% | VLDPE1 66.00%<br>LDPE1 4.00%<br>MASTERBATCH1 25.00%<br>MASTERBATCH2 5.00% |
| | layer 2 (19.1μ) | OSMB2 90.00%<br>OSMB1 10.00% | OSMB2 90.00%<br>OSMB1 10.00% | OSMB2 90.00%<br>OSMB1 10.00% | OSMB2 90.00%<br>OSMB1 10.00% |
| | layer 3 (21.6μ) | LDPE3 70.00%<br>VLDPE3 30.00% | LDPE3 70.00%<br>VLDPE3 30.00% | LDPE3 70.00%<br>VLDPE3 30.00% | LDPE3 70.00%<br>VLDPE3 30.00% |
| | layer 4 (0.5μ) | ADHESIVE 1 - 100% | ADHESIVE 1 - 100% | ADHESIVE 1 - 100% | ADHESIVE 2 - 100.% |
| | layer 5 (12.7μ) | PET2 - 100% | PET1 - 100% | PET3 - 100% | PET1 - 100% |

TABLE 4

| | | Examples | | | |
|---|---|---|---|---|---|
| | No Layer (thickness) | Ex. 5 | | Ex. 6 | |
| 3-layers barrier laminate (Ex. 5: 50.9μ; Ex. 6: 50.1μ) | layer 1 (10.2μ) | VLDPE2 76.00%<br>LDPE2 10.00%<br>LDPE1 4.00%<br>MASTERBATCH3 10.00% | layer 1 (7.9μ) | VLDPE2 76.00%<br>LDPE2 10.00%<br>LDPE1 4.00%<br>MASTERBATCH3 10.00% | |
| | layer 2 (19.1μ) | OSMB2 90.00%<br>OSMB1 10.00% | layer 2 (19.1μ) | OSMB2 90.00%<br>OSMB1 10.00% | |
| | layer 3 (21.6μ) | LDPE3 70.00%<br>VLDPE3 30.00% | layer 3 (23.1μ) | LDPE3 70.00%<br>VLDPE3 30.00% | |
| | layer 4 (0.5μ) | ADHESIVE 1 - 100% | | ADHESIVE 1 - 100% | |
| | layer 5 (12.2μ) | PET1 100.00% | | PET1 - 100% | |

TABLE 5

| | No Layer (thickness) | Ex. 7 | Ex. 8 |
|---|---|---|---|
| 3-layer barrier laminate (50.9μ) | layer 1 (10.2μ) | VLDPE1 96.00% LDPE1 4.00% | VLDPE1 59.00% LDPE1 4.00% MASTERBATCH5 23.00% MASTERBATCH6 10.00% VLDPE5 2.00% VLDPE6 2.00% |
| | layer 2 (19.1μ) | OSMB2 90.00% MASTERBATCH4 10.00% | OSMB2 90.00% MASTERBATCH4 10.00% |
| | layer 3 (21.6μ) | LDPE3 70.00% VLDPE3 30.00% | LDPE3 55.00% VLDPE3 30.00% MASTERBATCH2 15.00% |
| | layer 4 (0.5μ) | ADHESIVE 1 - 100% | ADHESIVE 1 - 100% |
| | layer 5 (12.2μ) | PET1 100.00% | PET1 - 100% |

The comparative example is reported in Table 6.

TABLE 6

| | | Comparative example |
|---|---|---|
| | No Layer (thickness) | Comparative example. |
| 5-layers barrier laminate (57μ) | layer 1 (29μ) | LDPE4 1.00% LDPE5 2.00% LDPE6 47.00% LDPE7 49.00% LDPE8 0.50% LDPE9 0.50% |
| | layer 2 (4μ) | LLDPE-md1 100.00% |
| | layer 3 (5μ) | EVOH 100.00% |
| | layer 4 (4μ) | LLDPE-md1 100.00% |
| | layer 5 (15μ) | LDPE6 50.00% LDPE10 50.00% |
| | layer 6 (4μ) | ADHESIVE 3 |
| | Layer 7 (12μ) | biaxially oriented PET film chemically primed/ Monolayer PET film Corona treated, sold as Nuroll PKR 12 microns |

The films of the present invention have been prepared as follows:

Layers 1-3, that is the sealant layer, oxygen scavenging layer, and bulk or abuse layer were co-extruded on a round die system on a blown film process. The extrusion system was configured to control blend ratios of layer components particularly for the oxygen scavenging layer to assure the desired ratio of oxygen scavenger component versus catalyst. Additionally, the extrusion system was configured to control layer thickness particularly for the oxygen scavenging layer as the amount of scavenging capacity is proportional to the layer thickness. Sealant layer thickness is also important to insure the desired seal strength for specific applications. Finally, the extrusion system—follows a well-defined set of conditions (SOC's) with limits to maintain good film flatness by stabilizing bubble geometry and quench rates, also important for further converting processes. Once the film is extruded it can be triggered and then laminated and slit or laminated and then triggered prior to slitting or several other logistical plans to achieve the final slit rolls to use for the packaging application.

The extruded three-layers film was then laminated with an adhesive layer to a substrate layer made of PET that had been coated with aluminum oxide. The substrate was printed prior to lamination.

Lamination of the three layer film to the substrate combines the properties of both to fit the needs of the final converting process that makes the final bags or pouches for the end use product.

The laminated film is cured for the appropriate time and then activated. This activation utilizes electron beam energy at a dosage from about 70 to about 130 kGy, with a target of 100 kGy. The dosage level measured in kilograys (kGy) is verified by measuring percent gel in a specific PE sent through the activating unit adhered to the film; the percent gel is proportional to the dosage. A scavenging test is also carried out to insure the film is triggered and begins scavenging.

From this point in the process, the film is time monitored during its exposure to ambient air.

The comparative film was prepared as follows:

Layers 1-5 were coextruded on a round die system on a blown film process. The coextruded five-layer film was then laminated with an adhesive layer to a substrate layer comprising PET that was corona treated.

Peroxide Value.

Peroxide Value is one of the most widely used tests for oxidative rancidity in oils and fats. Peroxide value is a measure of the concentration of peroxides and hydroperoxides formed in the initial stages of lipid oxidation. Milliequivalents of peroxide per kg of fat are measured by titration with iodide ion. It is difficult to provide a specific guideline relating peroxide value to rancidity. High peroxide values are a definite indication of a rancid fat, but moderate values may be the result of depletion of peroxides after reaching high concentrations. Peroxide value is applicable to all normal fats and oils, Peroxide testing can only be accurately performed on oils.

AOCS Cd8-53 Standard Method

Reagents and Solution

1. Acetic Acid—chloroform solution (7.2 ml Acetic Acid and 4.8 ml Chloroform).
2. Saturated Potassium Iodide solution. Store in the dark.
3. Sodium thiosulfate solution, 0.1N. Commercially available.
4. 1% Starch solution. Commercially available.
5. Distilled or deionized water.

Procedure
1. Weigh 2.00 (±0.02)g of sample into a 100 ml glass stoppered Erlenmeyer flask. Record weight to the nearest 0.01 g.
2. By graduated cylinder, add 12 ml of the acetic acid—chloroform solution.
3. Swirl the flask until the sample is completely dissolved (careful warming on a hot plate may be necessary).
4. Using 1 ml Mohr pipette, add 0.2 ml of saturated potassium iodide solution.
5. Stopper the flask and swirl the contents of the flask for exactly one minute.
6. Immediately add by graduated cylinder, 12 ml of either distilled or deionized water, stopper and shake vigorously to liberate the iodine from the chloroform layer.
7. Fill the burette with 0.1N sodium thiosulfate.
8. If the starting color of the solution is deep red orange, titrate slowly with mixing until the color lightens. If the solution is initially a light amber color, go to step 9.
9. Using a dispensing device, add 1 ml of starch solution as indicator.
10. Titrate until the blue gray color disappears in the aqueous (upper layer).
11. Accurately record the mls of titrant used to two decimal places.

Peroxide values of fresh oils are less than 10 milliequivalents/kg, when the peroxide value is between 30 and 40 milliequivalents/kg, a rancid taste is noticeable.

A product containing unsaturated oils, namely corn and/or sunflower oil, was packed in with the oxygen scavenging film of the present invention; a product containing the same unsaturated oils was packed in with a conventional barrier film.

The amount of peroxides produced in the package of the invention and in the conventional barrier package was measured as described above. The amount of peroxides produced in the package of the invention is significantly lower than the amount of peroxides produced in the comparative package.

These findings support the fact that the oxygen scavenging film of the present invention is able to capture the oxygen present in the headspace thus reducing the degree of oxidation of the unsaturated oils contained in the packaged food.

The excellent performance of the film of the present invention in term of oxygen capture provides a way to address the trend existing in the food marketplace to avoid the use of highly saturated oils in favor of unsaturated alternatives which are healthier but more oxygen sensitive.

Furthermore, the film of the present invention is able to substantially capture the volatile compounds that are due to byproducts of the oxidation of the oxygen scavenging component, thus these films do not lead to significant deterioration of the organoleptic qualities of the packaged product due to the oxidation of the fats in cases more oxygen sensitive unsaturated oils are present in the product.

The film of the present invention offers improvement in both shelf life and quality of the oxygen sensitive packaged products, in particular in the case of products wherein oxygen sensitive unsaturated oils are present, such as dried milk.

The invention claimed is:

1. A multilayer oxygen scavenging film comprises:
   A) a first outer sealant layer, comprising from 5 to 25% by weight of a masterbatch comprising a zeolite and zinc oxide and from 5 to 15% by weight of a masterbatch comprising a zeolite,
   B) one oxygen scavenging layer comprising a blend of from 15 to 5% by weight of a catalyst in a carrier resin and from 85 to 95% by weight of ethylene/methyl acrylate/cyclohexene methyl acrylate copolymer (EMCM), wherein the catalyst is cobalt oleate or cobalt (II) neodecanoate and the catalyst carrier resin is ethylene methyl acrylate copolymer (EMA),
   C) one bulk layer comprising from 10 to 50% by weight of very low density ethylene/butene copolymer, and from 50 to 90% by weight of low density polyethylene homopolymer,
   D) one adhesive layer comprising a binary blend of from 48 to 58% by weight of isocyanate- aromatic and from 42 to 52% by weight of polyol-polyester coreactant or a ternary blend of from 3 to 13% by weight of polyol-polyester coreactant, from 48 to 58% by weight of ethyl acetate and from 34 to 44% by weight of isocyanate-aromatic isocyanate, and
   E) a second outer substrate layer comprising PET, wherein
   said second outer substrate layer E) has a thickness greater than 5% with respect to the total thickness of the film.

2. A multilayer oxygen scavenging film according to claim 1, wherein the first outer sealant layer further comprises a material selected from very low density ethylene/alpha olefin copolymer and low density polyethylene homopolymer.

3. A multilayer oxygen scavenging film according to claim 1, wherein the first outer sealant layer comprises at least an antiblock agent.

4. A multilayer oxygen scavenging film according to claim 1, wherein the at least one adhesive layer further comprises a material selected from one or more polyolefins, one or more modified polyolefins and a blend thereof.

5. A multilayer oxygen scavenging film according to claim 1, wherein the second outer substrate layer comprising the PET is coated with a metal oxide.

6. A multilayer oxygen scavenging film according to claim 1, wherein the total thickness of the film may vary from 10 to 100 microns.

7. A multilayer oxygen scavenging film according to claim 1, wherein the thickness of the oxygen scavenging layer may vary from 10 to 30 microns.

8. A multilayer oxygen scavenging film according to claim 1, wherein the oxygen scavenging layer may represent from 10 to 47% of the total thickness of the film.

9. A multilayer oxygen scavenging film according to claim 1, wherein the thickness of the second outer substrate layer may vary from 10 to 30 microns; and wherein the second outer substrate layer represent from 6 to 47% of the total thickness of the film.

10. A multilayer oxygen scavenging film comprising
    A) a first outer sealant layer optionally comprising from 5 to 15% by weight of a masterbatch comprising a zeolite, zinc oxide and magnesium oxide;
    B) one oxygen scavenging layer comprising a blend of from 15 to 5% by weight of a catalyst in a carrier resin and from 85 to 95% by weight of EMCM, wherein the catalyst is cobalt oleate or cobalt (II) neodecanoate and the catalyst carrier resin is ethylene methyl acrylate copolymer (EMA);
    C) one bulk layer comprising from 5 to 15% by weight of a masterbatch comprising a zeolite, from 25 to 35% by weight of very low density ethylene/butene copolymer, and from 70 to 50% by weight of low density polyethylene homopolymer;

D) one adhesive layer comprising a binary blend of from 48 to 58% by weight of isocyanate- aromatic and from 42 to 52% by weight of polyol-polyester coreactant or a ternary blend of from 3 to 13% by weight of polyol-polyester coreactant, from 48 to 58% by weight of ethyl acetate and from 34 to 44% by weight of isocyanate-aromatic isocyanate;

E) a second outer substrate layer comprising PET, optionally aluminum oxide coated, having a thickness greater than 5% with respect to the total thickness of the film.

11. A multilayer oxygen scavenging film according to claim 10, wherein the thickness of the second outer substrate layer may vary from 10 to 30 microns; and wherein the second outer substrate layer represent from 6 to 47% of the total thickness of the film.

12. A multilayer oxygen scavenging film according to claim 10, wherein the thickness of the oxygen scavenging layer may vary from 10 to 30 microns and represents 10 to 47% of the total thickness of the film.

13. A multilayer oxygen scavenging film comprising
A) a first outer sealant layer comprising from 5 to 15% by weight of a masterbatch comprising ceramic spheres (beads)-alkali-alumino-silicate ceramic;
B) one oxygen scavenging layer comprising a blend of from 15 to 5% by weight of a catalyst in a carrier resin and from 85 to 95% by weight of EMCM, wherein the catalyst is cobalt oleate or cobalt (II) neodecanoate and the catalyst carrier resin is ethylene methyl acrylate copolymer (EMA);
C) one bulk layer comprising from 10 to 50% by weight of very low density ethylene/butene copolymer, and from 50 to 90% by weight of low density polyethylene homopolymer;
D) one adhesive layer comprising a binary blend of from 48 to 58% by weight of isocyanate- aromatic and from 42 to mm % by weight of polyol-polyester coreactant or a ternary blend of from 3 to 13% by weight of polyol-polyester coreactant, from 48 to 58% by weight of ethyl acetate and from 34 to 44% by weight of isocyanate-aromatic isocyanate;
E) a second outer substrate layer comprising PET, optionally aluminum oxide coated, having a thickness greater than 5% with respect to the total thickness of the film.

14. A multilayer oxygen scavenging film according to claim 13, wherein the thickness of the second outer substrate layer may vary from 10 to 30 microns; and wherein the second outer substrate layer represent from 6 to 47% of the total thickness of the film.

15. A multilayer oxygen scavenging film according to claim 13, wherein the thickness of the oxygen scavenging layer may vary from 10 to 30 microns and represents from 10 to 47% of the total thickness of the film.

16. A process for manufacturing a film according to claim 1 comprises:
a) providing a coextruded film comprising the first outer sealant layer, the oxygen scavenging layer and the at least one bulk layer;
b) providing a substrate comprising PET; and
c) adhering the coextruded film to the substrate with the adhesive.

17. A package comprising a container, a product and a lid comprising the oxygen scavenging film according to claim 1 sealed onto the container.

18. A bag, or pouch or multi-compartment tray-less package made of the oxygen scavenging film according to claim 1 sealed onto itself.

19. A bag, a pouch or multi-compartment tray-less package made of the oxygen scavenging film according to claim 1 sealed onto itself and containing a product.

20. A method of using the oxygen scavenging film according to claim 1 comprising the step of packaging food within the scavenging film.

* * * * *